(12) United States Patent
Van Der Velde et al.

(10) Patent No.: US 12,382,352 B2
(45) Date of Patent: Aug. 5, 2025

(54) METHOD AND APPARATUS FOR CONDITIONAL HANDOVER IN WIRELESS COMMUNICATION NETWORK

(71) Applicant: Samsung Electronics Co., Ltd., Suwon-si (KR)

(72) Inventors: Himke Van Der Velde, Staines (GB); Mangesh Abhimanyu Ingale, Staines (GB); Fasil Abdul Latheef, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 375 days.

(21) Appl. No.: 17/635,831

(22) PCT Filed: Aug. 14, 2020

(86) PCT No.: PCT/KR2020/010906
§ 371 (c)(1),
(2) Date: Feb. 16, 2022

(87) PCT Pub. No.: WO2021/034053
PCT Pub. Date: Feb. 25, 2021

(65) Prior Publication Data
US 2022/0303845 A1    Sep. 22, 2022

(30) Foreign Application Priority Data

Aug. 16, 2019   (IN) .............................. 201931033127
Aug. 13, 2020   (GB) ..................................... 2012679

(51) Int. Cl.
*H04W 36/00*    (2009.01)
*H04W 36/24*    (2009.01)
*H04W 36/36*    (2009.01)

(52) U.S. Cl.
CPC .  *H04W 36/00837* (2018.08); *H04W 36/0058* (2018.08); *H04W 36/0061* (2013.01); *H04W 36/249* (2023.05); *H04W 36/362* (2023.05)

(58) Field of Classification Search
None
See application file for complete search history.

(56) References Cited

U.S. PATENT DOCUMENTS 9,591,545  B2   3/2017  Tamura et al.
2019/0223073 A1  7/2019  Chen et al.
(Continued)

FOREIGN PATENT DOCUMENTS

EP   3358901 A1   8/2018
EP   3766274 A1   1/2021
(Continued)

OTHER PUBLICATIONS

Zte Corporation et al., 'Discussion on the configuration of CHO execution conditions', R2-1907108, 3GPP TSG RAN WG2 Meeting #106, May 3, 2019, Reno, USA. Sections 1-3.
(Continued)

*Primary Examiner* — Benjamin Lamont
(74) *Attorney, Agent, or Firm* — Jefferson IP Law, LLP

(57) ABSTRACT

A method of a base station in a wireless communication system is provided. The method includes: configuring a conditional handover (CHO) condition for a User Equipment (UE); and transmitting a message including the configured CHO condition to the UE, wherein the CHO condition comprises a measurement object and a report configuration field.

11 Claims, 6 Drawing Sheets

(56) References Cited

U.S. PATENT DOCUMENTS

| | | | |
|---|---|---|---|
| 2019/0380081 | A1 | 12/2019 | Chang et al. |
| 2021/0029600 | A1* | 1/2021 | Balan ............... H04W 36/0094 |
| 2022/0022121 | A1* | 1/2022 | Eklöf et al. ....... H04W 36/0094 |
| 2022/0053388 | A1* | 2/2022 | Kim ...................... H04W 76/27 |
| 2022/0217597 | A1* | 7/2022 | Ishii ................ H04W 36/00838 |
| 2022/0264397 | A1* | 8/2022 | da Silva ............ H04W 36/0058 |
| 2022/0272590 | A1* | 8/2022 | Uemura ................ H04W 24/10 |
| 2022/0386197 | A1 | 12/2022 | Hwang et al. |
| 2023/0239752 | A1* | 7/2023 | Balan ................ H04W 36/0058 370/331 |
| 2024/0015626 | A1* | 1/2024 | Chang .................. H04W 76/27 |

FOREIGN PATENT DOCUMENTS

| | | | |
|---|---|---|---|
| EP | 3884706 | A1 | 9/2021 |
| EP | 3909292 | A1 | 11/2021 |
| KR | 10-2018-0122963 | A | 11/2018 |
| WO | 2018/113661 | A1 | 6/2018 |
| WO | WO-2018203716 | A1 * | 11/2018 ........ H04W 36/0055 |
| WO | 2019/175463 | A1 | 9/2019 |
| WO | 2020/162811 | A1 | 8/2020 |
| WO | 2020/167034 | A1 | 8/2020 |
| WO | 2020/218587 | A1 | 10/2020 |
| WO | 2020/226374 | A1 | 11/2020 |
| WO | 2021/029649 | A1 | 2/2021 |

OTHER PUBLICATIONS

Intel Corporation, 'Cho execution condition', R2-1906293, 3GPP TSG RAN WG2 Meeting #106, May 3, 2019, Reno, USA. Sections 1-3.
China Telecom, 'Reconfiguration and deconfiguration of CHO', R2-1907139, 3GPP TSG RAN WG2 Meeting #106, May 2, 2019, Reno, USA. Sections 2-3.
Huawei HiSilicon, 'Considerations on modification of CHO configurations by RRC signalling', R2-1907672, 3GPP TSG RAN WG2 Meeting #106, May 3, 2019, Reno, USA. Sections 2-3.
Intel Corporation, 'Failure handling on CHO', R2-1906292, 3GPP TSG RAN WG2 Meeting #106, Reno, USA, May 3, 2019 sections 2-3.
Qualcomm Incorporated; Conditional HO configuration handling; 3GPP TSG RAN WG2 107, R2-1908934; Aug. 15, 2019, Prague, CZ, https://www.3gpp.org/ftp/tsg ran/WG2 RL2/TSGR2 107/Docs/ R2 1908934.zip see p. 2 par. 1 and proposals 1-2.
Ericsson; Configuration of Conditional handover in LTE; 3GPP TSG RAN WG2 107; R2-1909320; Aug. 15, 2019, Prague, Czech Republic. https://www.3gpp.org/ftp/tsg_ran/WG2_RL2/TSGR2_107/ Docs/R2 1909320.zip see pp. 4-5.
Samsung; Conditional HO, basic signalling aspects; 3GPP TSG RAN WG2 106, R2-1906763; May 13, 2019, Reno, USA. https:// www.3gpp.org/ftp/tsg_ran/WG2_RL2/TSGR2_106/Docs/R2 1906763. zip see p. 2 sec. 2.2.
Ericsson; Conditional Handover Execution in NR; 3GPP TSG RAN WG2 #106, R2-1906212; May 13, 2019, Reno, USA. (https://www. 3gpp.org/ftp/TSG_RAN/WG2_RL2/TSGR2_106/Docs/R2 -1906212. zip) see p. 2.
Great Britain Office Action dated Feb. 11, 2021, issued in a counterpart GB Application No. 2012679.3.
Great Britain Office Action dated Dec. 9, 2021, issued in a counterpart GB Application No. 2114753.3.
Great Britain Search Report dated Jun. 24, 2022, issued in a counterpart GB Application No. 2208433.9.
Great Britain Office Action dated Jun. 24, 2022, issued in a counterpart GB Application No. 2114753.3.
Extended European Search Report dated Nov. 18, 2022, issued in a counterpart European Application No. 20855305.7-1216.
Intel Corporation; Further consideration on conditional handover; 3GPP TSG RAN WG2 Meeting #105bis; R2-1903451, Revision of R2-1901365; Apr. 6, 2019, Xian, China.
European Office Action dated Dec. 9, 2024, issued in European Patent Application No. 20855305.7.

* cited by examiner

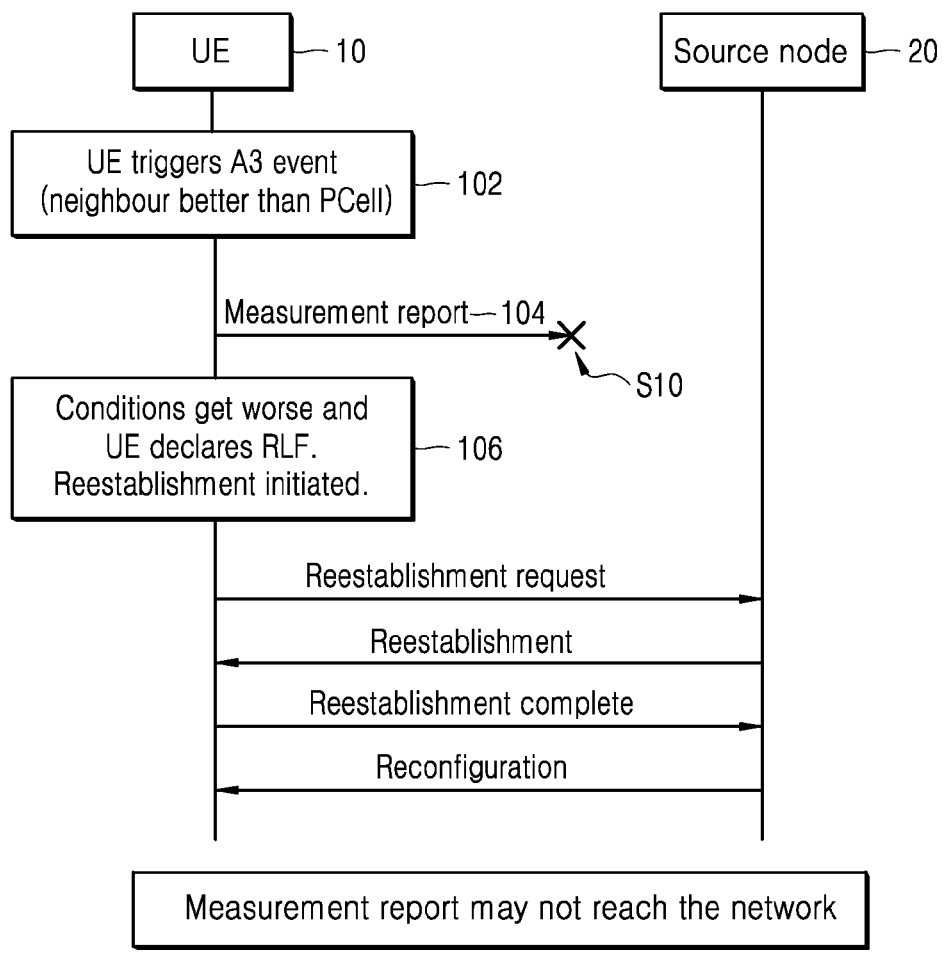

[Fig. 1b]
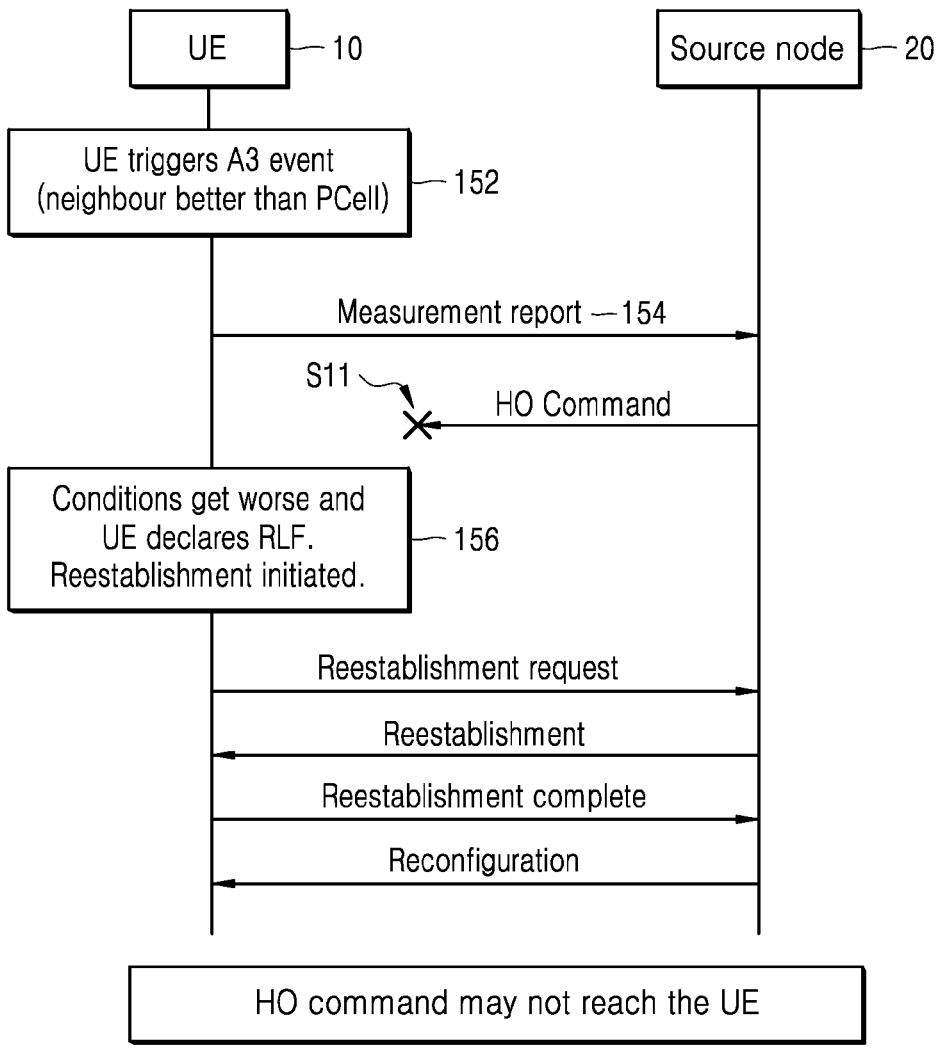
[Fig. 2a]
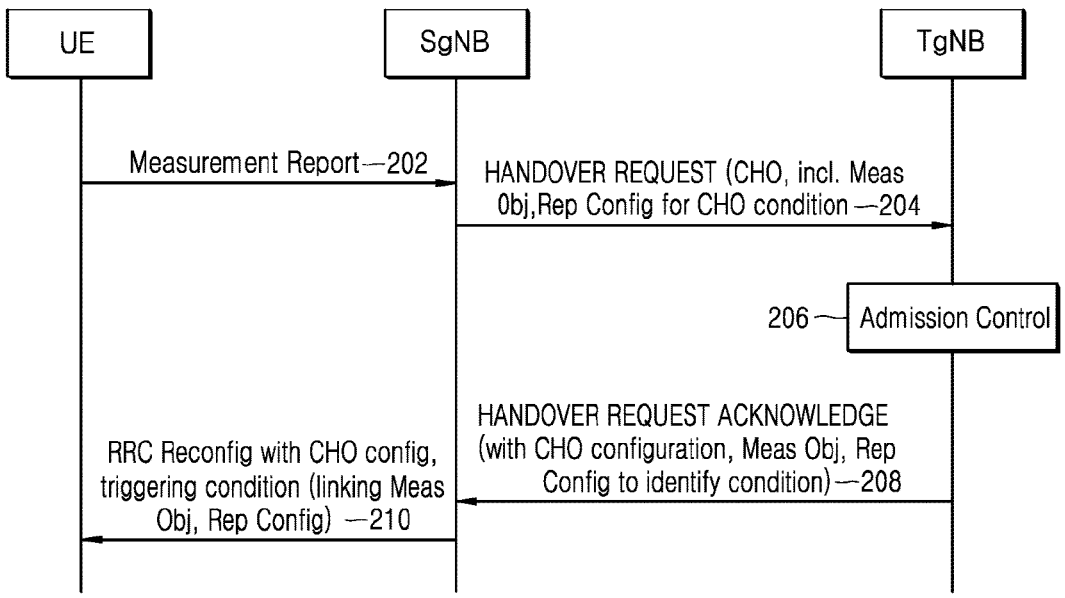

[Fig. 2b]
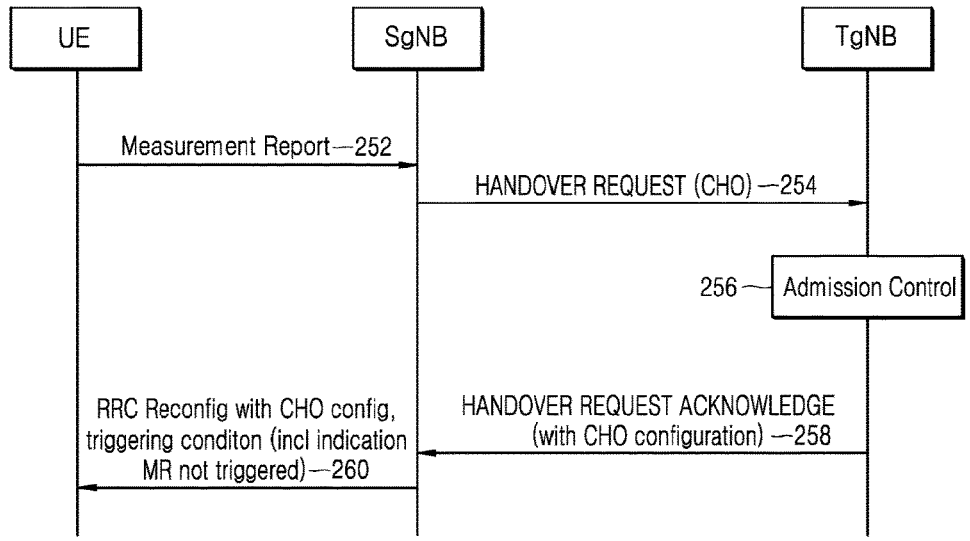
[Fig. 3a]
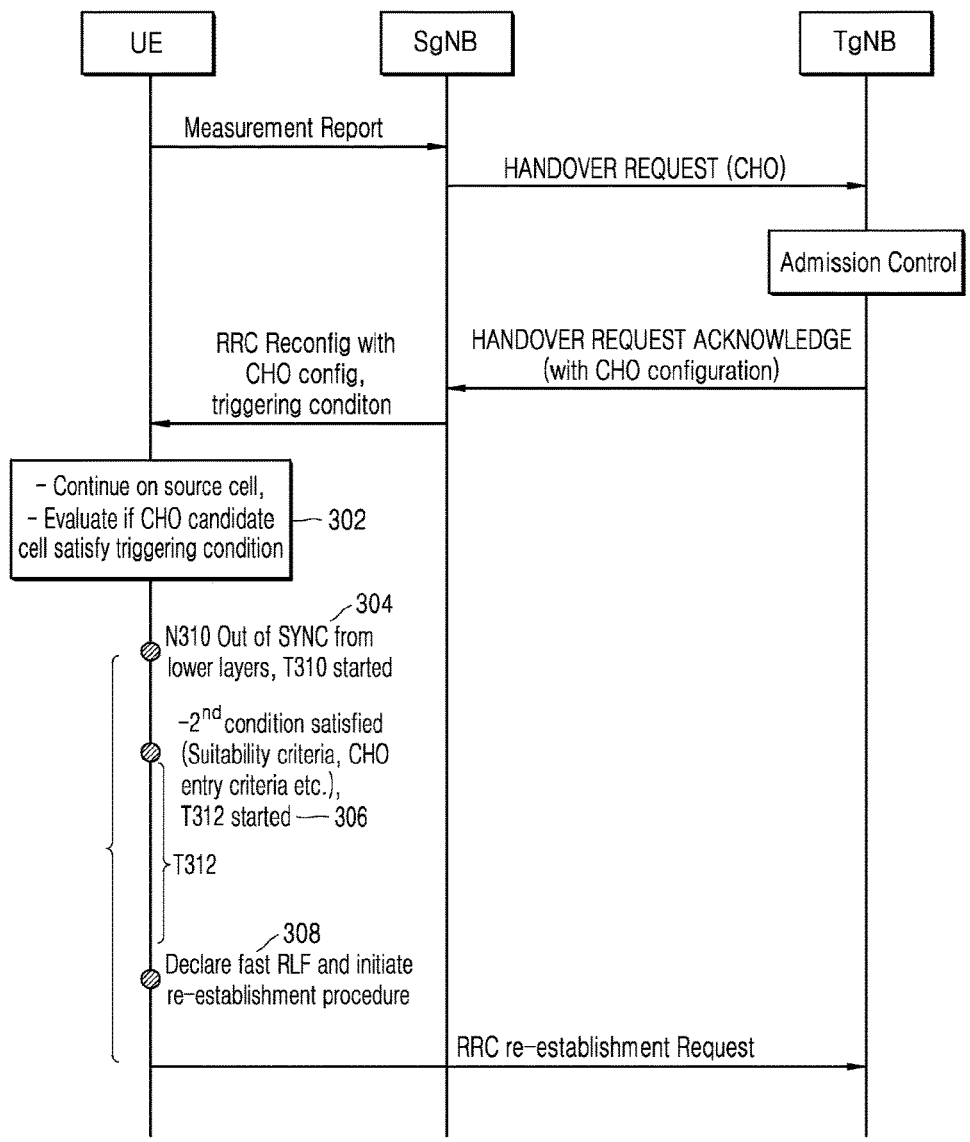

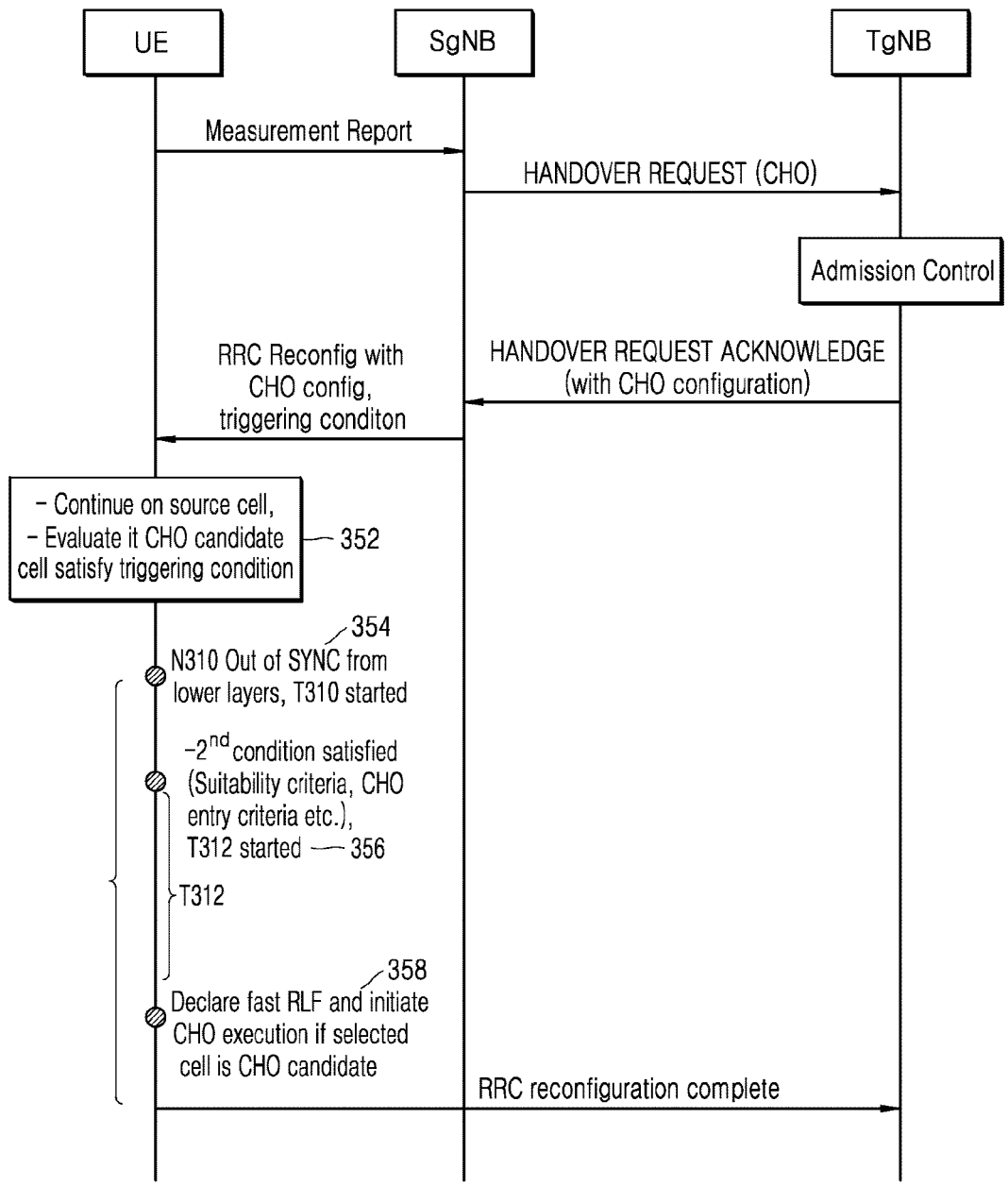

[Fig. 4]
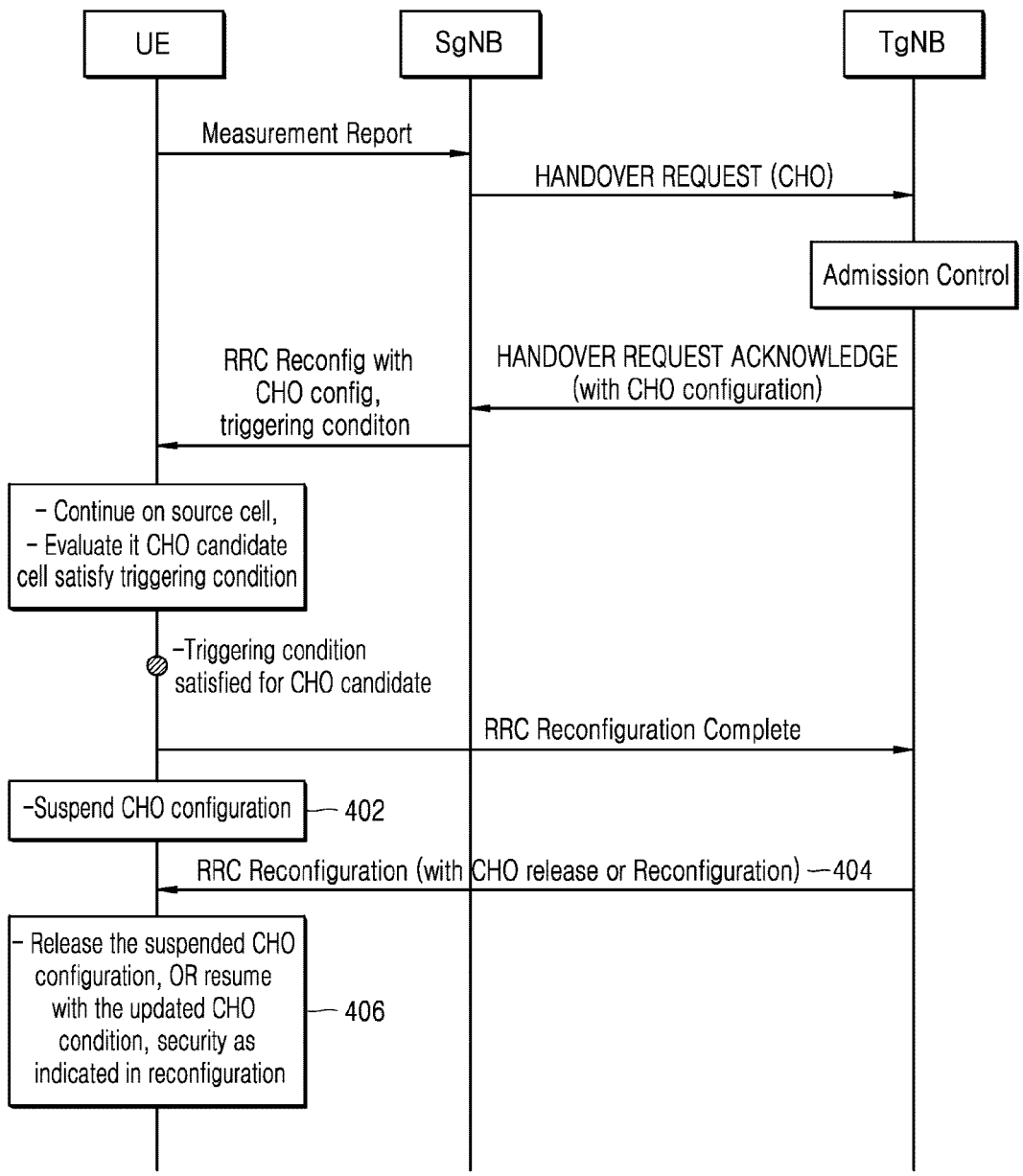
[Fig. 5]
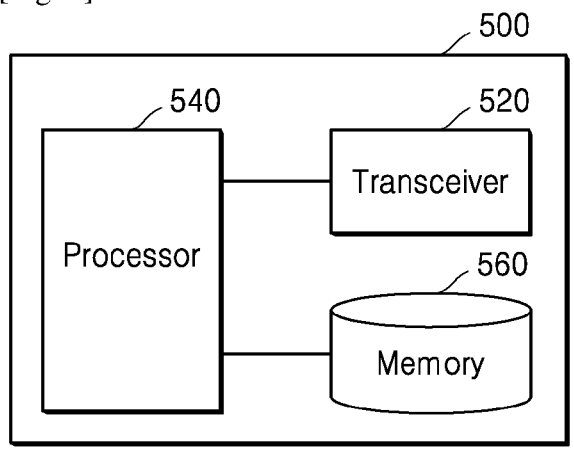

[Fig. 6]
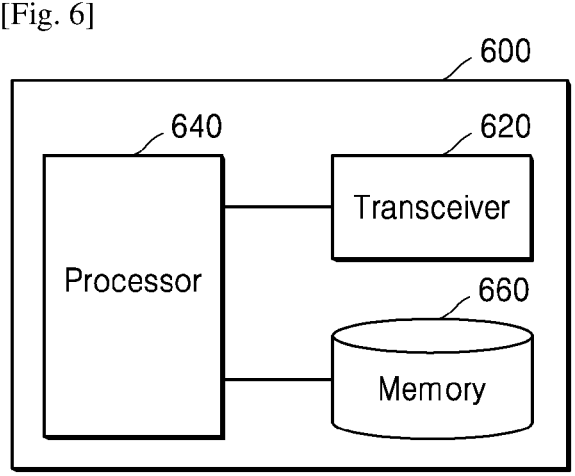

METHOD AND APPARATUS FOR CONDITIONAL HANDOVER IN WIRELESS COMMUNICATION NETWORK

TECHNICAL FIELD

The present disclosure relates to conditional handover come up which is a new form of managing handovers in fifth generation (5G) mobile networks.

BACKGROUND ART

To meet the demand due to ever-increasing wireless data traffic after the commercialization of the 4th generation (4G) communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. Implementation of the 5G communication system using ultra-frequency millimeter wave (mmWave) bands, e.g., 60 giga hertz (GHz) bands, is considered to attain higher data transfer rates. To reduce propagation loss of radio waves and increase a transmission range in the ultra-frequency bands, beamforming, massive multiple-input multiple-output (MIMO), Full Dimensional MIMO (FD-MIMO), array antenna, analog beamforming, and large-scale antenna techniques are under discussion. To improve system networks, technologies for advanced small cells, cloud Radio Access Networks (RANs), ultra-dense networks, device to device (D2D) communication, wireless backhaul, moving networks, cooperative communication, Coordinated Multi-Points (CoMP), reception-end interference cancellation and the like are also being developed in the 5G communication system. In addition, in the 5G system, an advanced coding modulation (ACM), e.g., hybrid frequency-shift keying (FSK) and quadrature amplitude modulation (QAM) (FQAM), sliding window super-position coding (SWSC), and an advanced access technology, e.g., filter bank multi carrier (FBMC), non-orthogonal multiple access (NOMA), and sparse code multiple access (SCMA), are being developed.

In the meantime, the Internet is evolving from a human-centered connectivity network where humans generate and consume information into an Internet of Things (IoT) network where distributed entities such as things transmit, receive and process information without human intervention. Internet of Everything (IoE) technologies combined with IoT, such as big data processing technologies through connection with a cloud server, for example, have also emerged. To implement IoT, various technologies, such as a sensing technology, a wired/wireless communication and network infrastructure, a service interfacing technology, and a security technology are required, and recently, even technologies for sensor network, Machine to Machine (M2M), Machine Type Communication (MTC) for connection between things are being studied. Such an IoT environment may provide intelligent Internet Technology (IT) services that generate a new value to human life by collecting and analyzing data generated among connected things. IoT may be applied to a variety of areas, such as smart homes, smart buildings, smart cities, smart cars or connected cars, smart grids, health care, smart home appliances and advanced medical services through convergence and combination between existing Information Technologies (IT) and various industrial applications.

In this regard, various attempts to apply the 5G communication system to the IoT network are being made. For example, technologies regarding a sensor network, M2M, MTC, etc., are implemented by the 5G communication technologies, such as beamforming, MIMO, array antenna schemes, etc. Even application of a cloud Radio Access Network (cloud RAN) as the aforementioned big data processing technology may be viewed as an example of convergence of 5G and IoT technologies.

DISCLOSURE OF INVENTION

Solution to Problem

The present disclosure relates to a method and apparatus for managing handovers in wireless communication network.

BRIEF DESCRIPTION OF DRAWINGS

For a better understanding of the invention, and to show how embodiments of the same may be carried into effect, reference will now be made, by way of example only, to the accompanying diagrammatic drawings in which:

FIG. 1a illustrates issues in the uplink and downlink which provide a motivation for CHO, in general;

FIG. 1b illustrates other issues in the uplink and downlink which provide a motivation for CHO, in general;

FIG. 2a illustrates message exchanges in connection with a first embodiment of the disclosure;

FIG. 2b illustrate message exchanges in connection with a second embodiment of the disclosure;

FIG. 3a illustrates message exchanges in connection with a third embodiment of the disclosure;

FIG. 3b illustrates message exchanges in connection with a fourth embodiment of the disclosure;

FIG. 4 illustrates a message exchange in connection with a fifth embodiment of the disclosure;

FIG. 5 schematically illustrates a base station according to embodiments of the present disclosure; and FIG. 6 illustrates a user equipment (UE) according to embodiments of the present disclosure.

MODE FOR THE INVENTION

In 5G networks, there are new requirements for low latency and high reliability. There are many techniques utilised to achieve these goals, conditional handover being just one of them.

In conditional handover, CHO, instead of preparing one target cell, as known in the prior art, multiple candidate target cells are prepared in advance by the network, which enables the handover command to be sent to the mobile terminal or user equipment, UE, earlier than would normally be the case and, importantly, when radio conditions are still good, rather than when conditions begin to degrade as is known in the case of prior art handovers. Note that in this disclosure, the terms handover and PCell change are used interchangeably.

When received by the UE, it stores the conditional handover command rather than applying it immediately. The conditional handover command includes one or more candidate target cells, and for each, a condition and the configuration. The UE only applies the concerned configuration when the condition configured in the UE is satisfied for concerned candidate target cells. At this point, the UE executes the handover and connects to the target cell as if it were carrying out a prior art handover instructed by the network.

In the prior art, mobility in a connected mode, which is when a mobile terminal is active, is controlled by the network, assisted by measurements performed by the UE. The UE transmits measurement reports if the link to the serving cell is becoming degraded and/or another neighbouring cell is getting better than the serving cell. Based on these measurement reports sent by the UE, the network may possibly move or handover the mobile terminal connection from this serving cell to the improved neighbour cell, so that the mobile terminal will receive better radio conditions and consequently a better user experience. Note that UE may connect to multiple cells i.e. in case of carrier aggregation (CA) or dual connectivity (DC). This disclosure addresses the change of the primary Cell (PCell) i.e. from source PCell to target PCell. The source PCell is controlled by the source node and likewise the target PCell is controlled by the target node, which may be the same or a different RAN node (e.g. gNB or eNB).

In terms of known conditional handover techniques, it is known in the prior art that when the radio link in question becomes degraded and the mobile terminal needs to send measurement reports, the uplink is degraded and the reports may never reach the network. Further, even if such reports do reach the network, and the network tries to respond with a handover command, that may never reach the UE, perhaps because the downlink is also degraded. FIGS. 1A and 1B illustrates situations where a degraded uplink and downlink affect the ability to handover successfully.

In FIG. 1a, a UE 10 is in communication with a source node 20.

In step 102, the UE triggers an A3 event for transmitting a measurement report if a neighbouring cell is better than the current cell.

In step 104, after the UE triggers an A3 event, where a neighbouring cell is better than the current cell, it sends a measurement report to the source node 20. However, due to an uplink error S10, this is never received at the source node 20.

In step 106, eventually a Radio Link Failure, RLF, is declared and a reestablishment process is initiated as known in the prior art.

Referring to FIG. 1b, in step 152, the UE triggers an A3 event, where a neighbouring cell is better than the current cell.

In step 154, the UE sends a measurement report to the source node 20.

The measurement report from the UE 10 arrives at the source node 20, but the handover command never arrives at the UE 10 due to a downlink failure at S11.

In step 156, eventually a Radio Link Failure, RLF, is declared and again, a reestablishment process is triggered, as known in the prior art.

In both cases, user experience is adversely affected by this interruption to communications.

In known conditional handover techniques, the UE receives a handover command and stores it without applying it immediately. The conditional handover command comprises, for each candidate target cell, the configuration to be applied in the concerned cell and an associated condition to be monitored by the UE. When the condition is fulfilled, the UE applies the previously stored handover command as if the network had just sent it, instead of first sending a measurement report as in traditional handover techniques.

The condition that defines the criteria to apply the stored handover command is based on the quality of the serving cell and neighbouring cells, somewhat similar to the condition in traditional handover techniques which would lead the UE to transmit a measurement report. For instance, in the prior art, the network can configure the UE to transmit a measurement report when a neighbouring cell becomes somehow better than the currently serving cell, as a way to indicate to the network that a handover maybe needed. In known conditional handover techniques, a similar condition can be configured, except that instead of transmitting the measurement reports, the UE applies the stored message. Sending the handover command conditionally when the radio conditions are favourable reduces the risk of failure of either the measurement report from the UE or the handover command from the network.

It is an aim of embodiments of the present disclosure to address shortcomings in known conditional handover techniques whether mentioned herein or not.

According to the present disclosure there is provided an apparatus and method as set forth in the appended claims. Other features of the disclosure will be apparent from the dependent claims, and the description which follows.

According to an aspect of the disclosure, there is provided a method of configuring a conditional handover, CHO, condition for a User Equipment, UE, in a mobile telecommunication network, wherein the condition comprises a measurement object and a report configuration field In an embodiment, the measurement object and the report configuration field are included in a measConfig field.

In an embodiment, included in the measConfig field is an identifier, measID, linking the measurement object to one or more report configuration fields.

In an embodiment, the measConfig field includes an indicator to inform the UE whether it should perform measurement reporting for the concerned measID.

In an embodiment, the measurement object defines a frequency of a CHO candidate to be measured.

In an embodiment, the report configuration field defines details of an event upon which the UE triggers CHO to a target.

According to another aspect of the disclosure, there is provided a method of configuring conditional handover of a UE in a telecommunication network comprising the step of updating a source configuration while a CHO candidate is configured.

In an embodiment, a source node sends a reconfiguration message to change a source Pcell configuration.

In an embodiment, the reconfiguration message comprises a first part comprising parameters set by a node controlling source Pcell and a second part comprising parameters set by a node controlling target Pcell.

In an embodiment, if the second part is signaled for a particular CHO candidate, then the UE considers that a target configuration of the particular CHO candidate requires updating.

In an embodiment, the second part comprises delta signaling compared to updated source configuration According to another aspect of the disclosure, there is provided a method of performing conditional handover, CHO, of a User Equipment, UE, in a telecommunication network, comprising the steps of:
  the UE receiving a CHO instruction;
  the UE starting a timer with a predetermined value when the UE initiates CHO to a first CHO candidate;
  if the timer expires, the UE attempts reestablishment In an embodiment, If, before the timer expires, a condition is met, the UE stops trying to connect to the first CHO candidate and if another candidate is available, the UE attempts CHO with that other candidate.

In an embodiment, If the timer expires and another candidate is available, the UE attempts CHO with the other candidate and starts the timer again.

In an embodiment, the UE stops the timer when it successfully completes CHO.

All aspects of the present disclosure comprise a method and corresponding apparatus. The apparatus are configured to perform the respective methods. The apparatus comprise one or more network entities and may include a UE, a gNB, eNB or other network entity as appropriate.

Although a few preferred embodiments of the present disclosure have been shown and described, it will be appreciated by those skilled in the art that various changes and modifications might be made without departing from the scope of the disclosure, as defined in the appended claims. Further aspects of the disclosure are included in the following description.

The following description relates to several different areas for improvement of CHO and are presented, generally, in as close to a chronological order as possible, beginning with configuration steps and ending with actual execution of handover.

Throughout the following, it is important to note that one gNB or eNB (in the case of LTE) can control several cells. In general, UE operations are specified in terms which are agnostic of the Radio Access Network, RAN, architecture. In other words, the UE is aware of different cells and connects to them in accordance with commands received from the network. Handover, of any sort, is just a change of Pcell, regardless of whether the target Pcell is actually controlled by the same gNB or eNB.

An aspect of the present disclosure relates to CHO candidate configuration. It is known that CHO configuration may include two types of parameter: a first part of the CHO configuration that is set by the source node e.g. a condition to be met, and a second part of the CHO configuration that is set by the target node e.g. a configuration to be used in the candidate Pcell upon CHO execution. In an embodiment, the first part set by the source may include a parameter related to security, such as a parameter used to derive KgNB, such as NCC, NH. The parameter may further indicate explicitly or implicitly that the security key is to be refreshed.

A further aspect of the present disclosure relates to the condition that is part of the CHO candidate configuration and in particular how to signal it. As for RRM measurements, the condition comprises a Measurement Object (MO) and a reporting configuration field (reportConfig). The MO defines the frequency of a CHO candidate to be measured or evaluated for CHO while the reporting configuration defines the details of the condition i.e. the event upon which UE should trigger CHO execution for the concerned target.

In an embodiment of the disclosure, illustrated in FIG. 2a, these parameters—MO and reportConfig—are signaled as follows.

In step 202, the UE may transmit measurement report to the SgNB.

In step 204, the SgNB may transmit handover request with CHO, MO and reportConfig for CHO to the TgNB.

Firstly, the MO for CHO is included in the existing measConfig field, as used for measurements performed for RRM, as in a conventional handover, even if this is specific to CHO. FIG. 2a illustrates the UE, a source node (SgNB) and a Target node (TgNB).

Further, and likewise, the reportConfig for CHO is included in the existing measConfig field even if this is specific to CHO, rather than a regular (or RRM) handover.

In the CHO configuration, the identity of the applicable MO is included as well as one or more identities of the applicable reportConfigs. This is included in the part of the CHO configuration set by the node controlling the source Pcell and the identities refer to the corresponding measConfig. In other words, the CHO configuration is set by the same node.

In step 206, the TgNB may perform admission control.

In step 208, the TgNB may transmit handover request acknowledgment with CHO configuration, MO, reportConfig to identify condition and CHO configuration to the SgNB.

In step 210, the SgNB may transmit RRC Reconfig with CHO config and triggering condition for linking MO and reportConfig.

Referring to FIG. 2b, in step 252, the UE may transmit measurement report to the SgNB.

In step 254, the UE may transmit a handover request to the TgNB.

In an alternative embodiment, illustrated in FIG. 2b, the existing measConfig includes a measurement identity for CHO that links the MO and reportConfig to be used for CHO alike for a regular RRM measurements included in measConfig i.e. in this case the linking of the MO and the one or more reportConfig is done within the measConfig rather than within the CHO configuration. In this alternative approach, there is an indication included in measConfig that the UE should not perform measurement reporting for the concerned measID, as the measurement only defines the condition for CHO. This may be achieved by introducing a new field e.g. noMeasReport.

In step 256, the TgNB may perform admission control.

In step 258, the TgNB may transmit handover request acknowledgment with CHO configuration to the SgNB.

In step 260, the SgNB may transmit RRC Reconfig with CHO config and triggering condition including indication that UE should not perform measurement reporting.

By adopting the above approach(es), which feature multiple triggering conditions (i.e. defined by multiple reportConfigs), these can be made specific to CHO only and don't impact on regular RRM measurements as, e.g. used for conventional handovers.

Further, supporting multiple triggers for multiple reportConfigs enables the use of the A3 message (Neighbour becomes offset better than SpCell) for a first quantity and the A4 (Neighbour becomes better than threshold) message for a second quantity, thereby, for instance, allowing a comparison for one quantity and an absolute criterion for another e.g. use A3 for Reference Signal Received Power (RSRP) and A4 for Reference Signal Received Quality (RSRQ)

Further options are available. A first option is to re-use the same reportConfig as used for RRM or traditional HO. It is noted that a network may configure a regular RRM measurement for normal HO to the same CHO candidate, with CHO being merely used as fallback in case such normal HO fails as explained above. In such case, the configuration for the regular RRM measurement can be re-used by just configuring some minor differences regarding the parameters defining the condition.

It is noted that for several parameters (e.g. TTT, hysteresis) it seems possible to use the same value for the RRM measurement to assist normal handover and for CHO. For some other parameters it is not appropriate to use the same value. i.e. some CHO specific parameter would be needed as the condition for triggering the MR message and CHO would be somewhat different. As an example, when re-using a reportConfig, CHO may just require the addition of a single offset that ensures that UE initiates CHO for same candidate target PCell when the condition is slightly worse than the condition for sending an MR message to trigger a regular handover. For instance, a single offset is applied, which would, either be applied to serving PCell/PSCell or to a CHO candidate cell. This is an offset added either to Mn or Mp in the relevant conditions e.g. as shown below for the entering condition for A3 in NR (for the case where offset is added to Mn).

Alternatively, the condition for CHO may be specified completely separately from the ones used for regular RRM measurements e.g. by a separate reportConfig. This may be because there may not be a suitable reportConfig configured for RRM It is noted that some parameters are not relevant for CHO and are simply not used for CHO by UE i.e. they are ignored, such as parameters controlling what to include in a MeasurementReport message.

In a second option, reportConfig, which is also used for RRM, is re-used by introducing extensions for CHO.

A prior art RRM measurement has an associated identity (measId), a measurement object (measObject i.e. basically the frequency) and a reporting configuration (defining when report is triggered and what is to be reported).

In an embodiment, the network may configure a regular or prior art RRM measurement for normal or prior art HO to the same CHO candidate cell also, so that CHO is used merely as a fallback option in case the regular HO fails due to difficulty or failure in transferring the measurement report (MR, UL) message or handover command/synchronous reconfiguration to change PCell (DL). In such a case, the same configuration may be re-used along with some minor differences regarding the parameters controlling when the UE takes action.

In a normal RRC HO, the UE initiates MR message for a potential target PCell on a given frequency when a first condition is met e.g. signal below a certain threshold.

In CHO, the UE initiates CHO for the same candidate target PCell when the condition is slightly worse than the aforementioned first condition i.e. an offset is configured.

This arrangement reduces the signaling and thereby UE complexity, but may also reduce measurement burden on the UE, since the measurement and condition evaluation are nearly the same.

According to an aspect of the disclosure, when multiple CHO candidates meet the condition for CHO execution the UE selects which candidate to initiate CHO for. This CHO candidate selection process may be left up to UE implementation. However, the CHO candidate selection process could be constrained i.e. the candidates can be assessed in some manner such that only certain candidates are considered. In one embodiment, the candidates can be ranked according to a criterion (R) such that the UE is allowed to select only those candidates where the value of R is within some defined range from the value achieved by the best candidate. The network may signal some configuration parameters related to the ranking, so it is able to control the UE selection performed by the UE.

According to an aspect of the present disclosure, it is possible to update the source configuration while a CHO candidate is configured. An example of source reconfiguration is the configuration of new data bearers or configuration of new radio resources. As mentioned previously, part of the configuration concerning a CHO candidate is provided by the target node i.e. the configuration to be used upon executing CHO to the concerned candidate.

While a CHO candidate has been configured, it is possible to modify source PCell configuration as well as the actual configuration of the CHO candidate.

The message may include reconfiguration of CHO candidates e.g. by a field named cho-CandidateToAddModList that may comprise two parts:
  Part A: Parameters set by node controlling source Pcell (source node)
  Part B: Parameters set by node controlling target Pcell (target node)

If the UE updates the configuration of a CHO candidate (target configuration), it considers the
  updated source configuration as the baseline for the delta included in Part B. More specifically:
  a) If part B is not signaled for a CHO candidate, the UE considers that the target configuration for the concerned CHO remains same (no change). In this case there may still be changes to the configuration of the concerned CHO candidate i.e. changes due to parameters signaled by the source node e.g. changes to the parameters defining the condition upon which UE shall execute CHO and/or change of the security key due to the change of the security key KgNB of the Pcell (due to HO/change of Pcell or key refresh). In this case the source node may provide: an indication that key update is required and/or parameters that may be used when deriving a new security key.
  b) If part B is signaled for a CHO candidate, the UE considers that the target configuration for the concerned CHO needs to be updated. In this case, the UE considers part B to be the delta compared to the updated source configuration (i.e. not the delta compared to current target configuration).

A subsequent reconfiguration message can, besides including cho-CandidateToAddModList, with part A set by node controlling source PCell (condExecutionCond) and part B set by node CHO controlling candidate (condRRCReconfig i.e. Reconfiguration message embedded in octet string)

When part B is signaled, the UE considers the updated source PCell configuration resulting after processing the Reconfiguration message as the baseline for the delta signaling indicated by Part B (condRRCReconfig)

According to an aspect of the disclosure, it is possible to update source PCell after CHO has been configured, and as mentioned previously, this may also require the update of a prepared CHO candidate. To support this, the internode signaling supports the following: the Source node contacts the node controlling the CHO target in order to provide the updated source configuration, upon which the target node may or may not provide an updated target configuration (as it is a delta to the source PCell configuration). The Inter-node signaling between source and target node should support such a modification case, with the option for the target to return or not to return an updated configuration to be signaled to the UE Note that inter-node signaling thus need not only support the initial preparation of a CHO candidate, but that there is a need to support modification of a CHO candidate as the source PCell configuration may change after such initial CHO preparation and that this may require update of the CHO candidate.

As the source PCell configuration is used as baseline for the configuration of the CHO candidate, the change of the source PCell may require a change of the CHO configuration also. For this, the source node contacts the node controlling the node controlling the CHO target and informs it that it can subsequently provide an updated CHO configuration, if required. The internode signaling supports this option, which may be performed by using the same inter-node message as for normal (prior art) HO preparation, but with some different setting, as detailed below:

It should be noted that the updating handover preparation is not used for conventional handover, as conventional handover is executed immediately i.e. it concerns a one shot action.

For CHO, the source Pcell may initiate modification of a candidate target Pcell after preparation is applicable The inter node messages should thus support modification of a prepared CHO candidate. This may involve, amongst other messages the HandoverPreparationInfo. It is possible to indicate the requested changes to the preparation for CHO e.g. by indicating the changes compared to what was requested by a previous inter-node message. e.g. delta signaling, rather than full configuration Regarding the inter-node messages to use upon modification of a prepared CHO candidate, the possible options include: use of the same inter-node message as for prior art HO (contents may be set different); and/or use a different inter-node message as for prior art HO, but it may be set differently i.e. there may be some indication that it concerns a modification e.g. and that contents concern changes (delta signaling) rather than full configuration, as upon initial configuration.

According to an aspect of the disclosure, there are various options for handling Radio Link Failure, RLF. These options make use of a timer, similar to known timer T312 in the prior art.

In a first option, the situation illustrated in FIG. 3a is relevant.

In step 302, the UE may evaluate if CHO candidate cell satisfy triggering condition.

In step 304, upon detecting physical problems, the UE starts a timer T310. While T310 runs the UE attempts recovery (i.e. before declaring RLF)

While T310 runs, the UE performs radio link monitoring and stops T310 if the link recovers. If a cell meets the condition for CHO, the UE executes CHO to the concerned cell.

In step 306, if a cell meets a second condition, the UE starts a second timer (similar to T312). This second condition can be another condition e.g. the suitability criterion.

In step 308, upon T312 or T310 expiry, whichever comes first, the UE performs Reestablishment If it was the second timer that expired, a reestablishment process is performed to the cell for which the second timer was started.

In a second option, the situation illustrated in FIG. 3b is relevant.

In step 352, the UE may evaluate if CHO candidate cell satisfy triggering condition.

In step 354, upon detecting physical problems UE starts timer T310. While T310 runs the UE attempts recovery (i.e. before declaring RLF)

In step 356, while T310 runs, the UE performs radio link monitoring and stops T310 if the link recovers. If a cell meets a first condition, the UE starts a second timer (similar to T312).

Examples of the first condition include:
The entry condition of a measurement that is configures and for which the second timer applies The condition for performing CHO for a CHO candidate that is configured
Another condition e.g. suitability criterion for any cell detected by the UE In step 308, upon T312 or T310 expiry, whichever comes first, if the cell the UE selects concerns a CHO candidate, the UE performs CHO. Otherwise, the UE performs a reestablishment, possibly to the cell for which the second timer was started.

According to an aspect of the disclosure, there is an option for suspension of CHO candidates upon performing HO/executing CHO to another candidate.

This concerns the UE operations for the CHO candidate configuration upon HO/CHO. The current working assumption is that the UE autonomously releases the CHO candidate configuration In step 402, the UE may suspend CHO operation.

In step 404, the UE may receive request from the TgNB to release the suspended CHO operation.

In a first option, upon HO/CHO, the UE maintains CHO candidate configuration unless and until the network explicitly requests the UE to release it, but the UE suspends CHO operation until they are resumed. This is illustrated in FIG. 4.

In step 406, the UE may release the suspended CHO operation in response to the received request.

The UE autonomously resumes upon the 1st reconfiguration (i.e. may not be signaled explicitly). Suspension is required as, following HO/CHO, the security configuration of the CHO candidates needs updating. The node controlling the target PCell (i.e. new source cell) should provide the node controlling the CHO candidate with an updated KgNB.

That (new source) node may need to provide the UE with new security parameters i.e. NCC/NH. Based on the master key of the target PCell (i.e. new source cell) the UE calculates the key applicable for the CHO candidate with NCC or NH if received. That (new source) node cannot provide the new security parameters while sending the HO command to the UE but can only provide them after the UE successfully completes the CHO or HO (i.e. based on input it may receive during path switch following HO/CHO).

The condition for performing CHO may also need to be updated if for target PCell a different offset applies than for source PCell i.e. to accommodate differences in frequency (upon inter-frequency HO/CHO) and/or cell specific offsets. If the UE continues CHO based on incorrect offset (e.g. case of CHO), the UE applies incorrect condition and may erroneously trigger CHO. For CHO, the condition can only be updated upon the first reconfiguration following CHO.

Here, the general principle is to specify UE autonomous operations e.g. release only if really essential while upon any reconfiguration, the convention is to maintain configuration while changes are indicated by signaling the delta. At least some CHO candidates may still be good candidates for CHO after completing (C)HO.

According to an aspect of the disclosure, the use of timers for monitoring CHO is provided.

Upon executing CHO the UE starts one or more timers and options relate to the handling of start, stop and actions upon expiry of the timer, in particular.

In a first option, a single (similar to T304) timer is provided covering the multiple CHO candidates that the UE may successively try. The timer is started when the UE initiates CHO to a first CHO candidate. If a certain condition is met, then the UE stops trying to connect to a given CHO candidate and if another candidate is available, the UE attempts CHO towards it, unless the timer expires, for which see below.

If the timer expires, the UE performs reestablishment. The UE stops the timer when it successfully completes CHO In a second option, a single (similar to T304) timer is provided, monitoring CHO to one particular CHO candidate. The timer is started when the UE initiates CHO to a first CHO candidate. If the timer expires and another candidate is available, the UE attempts CHO and again starts the timer. If the timer expires and no other candidate is available, the UE performs Reestablishment. The UE stops the timer when it successfully completes CHO FIG. 5 is a block diagram illustrating a base station according to an exemplary embodiment of the present disclosure.

Referring to the FIG. 5, the base station 500 may include a processor 540, a transceiver 520 and a memory 560. However, all of the illustrated components are not essential. The base station 500 may be implemented by more or less components than those illustrated in FIG. 5. In addition, the processor 540 and the transceiver 520 and the memory 560 may be implemented as a single chip according to another embodiment.

The aforementioned components will now be described in detail.

The processor 540 may include one or more processors or other processing devices that control the proposed function, process, and/or method. Operation of the base station 500 may be implemented by the processor 540. For example, the processor 540 may configure a paging request from a network to a UE. Specifically, the processor 540 may transmit, via the transceiver 720, the configured paging request to the UE. The paging request may include a service ID and information indicating a priority of the paging request.

The transceiver 520 may include a RF transmitter for up-converting and amplifying a transmitted signal, and a RF receiver for down-converting a frequency of a received signal. However, according to another embodiment, the transceiver 520 may be implemented by more or less components than those illustrated in components.

The transceiver 520 may be connected to the processor 540 and transmit and/or receive a signal. The signal may include control information and data. In addition, the transceiver 520 may receive the signal through a wireless channel and output the signal to the processor 540. The transceiver 520 may transmit a signal output from the processor 710 through the wireless channel.

The memory 560 may store the control information or the data included in a signal obtained by the base station 500. The memory 560 may be connected to the processor 540 and store at least one instruction or a protocol or a parameter for the proposed function, process, and/or method. The memory 560 may include read-only memory (ROM) and/or random access memory (RAM) and/or hard disk and/or CD-ROM and/or DVD and/or other storage devices.

FIG. 6 illustrates a user equipment (UE) according to embodiments of the present disclosure.

Referring to the FIG. 6, the UE 600 may include a processor 640, a transceiver 620 and a memory 660. However, all of the illustrated components are not essential. The UE 600 may be implemented by more or less components than those illustrated in FIG. 6. In addition, the processor 640 and the transceiver 620 and the memory 660 may be implemented as a single chip according to another embodiment.

The aforementioned components will now be described in detail.

The processor 640 may include one or more processors or other processing devices that control the proposed function, process, and/or method. Operation of the UE 600 may be implemented by the processor 640. For example, the processor 640 may receive, via the transceiver 620, a paging request from a second network associated with a second USIM while the UE 600 is operating with a first USIM related to a first network. The processor 640 may identify the received paging request from the second network and determine a service ID associated with the paging request based on the identified paging request. The processor 640 may respond to the received paging request, neglect the received paging request or inform the second network that the UE 600 is not intending to respond to the received paging request based on the determined service ID.

The transceiver 620 may include a RF transmitter for up-converting and amplifying a transmitted signal, and a RF receiver for down-converting a frequency of a received signal. However, according to another embodiment, the transceiver 620 may be implemented by more or less components than those illustrated in components.

The transceiver 620 may be connected to the processor 640 and transmit and/or receive a signal. The signal may include control information and data. In addition, the transceiver 620 may receive the signal through a wireless channel and output the signal to the processor 640. The transceiver 620 may transmit a signal output from the processor 640 through the wireless channel.

The memory 660 may store the control information or the data included in a signal obtained by the UE 600. The memory 660 may be connected to the processor 640 and store at least one instruction or a protocol or a parameter for the proposed function, process, and/or method. The memory 660 may include read-only memory (ROM) and/or random access memory (RAM) and/or hard disk and/or CD-ROM and/or DVD and/or other storage devices.

In accordance with an embodiment of the present disclosure, a method of a base station in a wireless communication system is provided. The method may comprise: configuring a conditional handover (CHO) condition for a User Equipment (UE); and transmitting a message including the configured CHO condition to the UE. The CHO condition may comprise a measurement object and a report configuration field.

In an embodiment, the measurement object and the report configuration field are included in a measConfig field.

In an embodiment, the measConfig field includes a measurement identity for linking the measurement object to one or more report configuration fields.

In an embodiment, the measConfig field includes an indicator for the UE to determine whether or not to perform measurement reporting for the measurement identity.

In an embodiment, the measurement object represents a frequency of a CHO candidate to be measured.

In an embodiment, the report configuration field represents details of an event upon which the UE triggers CHO to a target.

In accordance with an embodiment of the present disclosure, a method of an user equipment (UE) is provided. The method may comprise updating a source configuration while a CHO candidate is configured.

In an embodiment, the method may further comprise receiving, from a source node, a reconfiguration message for changing a source Pcell configuration.

In an embodiment, the reconfiguration message may comprise a first part comprising parameters set by a node controlling source Pcell and a second part comprising parameters set by a node controlling target Pcell.

In an embodiment, the method may further comprise determining that a target configuration of the particular CHO candidate requires updating if the second part is signaled for a particular CHO candidate.

In an embodiment, the second part may comprise delta signaling compared to updated source configuration In accordance with an embodiment of the present disclosure, a method of an User Equipment (UE) in a wireless communication network is provided. The method may comprise: receiving a CHO instruction; starting a timer with a predetermined value when the UE initiates CHO to a first CHO candidate; and initiating a reestablishment if the timer expires.

In an embodiment, the method may further comprise: stopping trying to connect to the first CHO candidate if, before the timer expires, a condition is met; and attempting CHO with another available candidate.

In an embodiment, the method may further comprise attempting CHO with the other candidate and starts the timer again if the timer expires and another candidate is available.

In an embodiment, the method may further comprise stopping the timer when the CHO is successfully completed.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a terminal in a wireless communication system, the method comprising:
receiving, from a base station, a radio resource control (RRC) reconfiguration message including configuration information associated with a conditional handover (CHO);
identifying a first condition and a second condition for triggering a CHO execution for a candidate cell, based on the RRC reconfiguration message, wherein the first condition and the second condition are associated with a first measurement identity (ID) and a second measurement ID, respectively, wherein the first measurement ID is configured to link a first reporting configuration to a measurement object, wherein the second measurement ID is configured to link a second reporting configuration to the measurement object, wherein the first reporting configuration includes the first condition, and the second reporting configuration includes the second condition, and wherein the first condition is associated with one or more offset related quantities, and the second condition is associated with one or more threshold related quantities;
identifying whether the first condition is fulfilled, based on the one or more offset related quantities;
identifying whether the second condition is fulfilled, based on the one or more threshold related quantities;
in case that the first condition and the second condition are fulfilled for the candidate cell, identifying the candidate cell as a target cell; and
initiating the CHO execution for the target cell, based on the configuration information.

2. The method of claim 1, wherein the RRC reconfiguration message is associated with not performing a measurement reporting related operation for the first measurement ID and the second measurement ID.

3. The method of claim 1, further comprising:
starting a timer for the target cell upon the CHO execution; and
in case that a handover related procedure is successfully completed for the target cell, stopping the timer.

4. The method of claim 1, wherein the one or more offset related quantities include a reference signal received power (RSRP) or a reference signal received quality (RSRQ).

5. The method of claim 1, wherein the one or more threshold related quantities include a reference signal received power (RSRP) or a reference signal received quality (RSRQ).

6. A method performed by a base station in a wireless communication system, the method comprising:
transmitting, to a terminal, a radio resource control (RRC) reconfiguration message including configuration information associated with a conditional handover (CHO),
wherein the RRC reconfiguration message is associated with a first condition and a second condition for triggering a CHO execution for a candidate cell,
wherein the first condition and the second condition are associated with a first measurement identity (ID) and a second measurement ID, respectively,
wherein the first measurement ID is configured to link a first reporting configuration to a measurement object, and the second measurement ID is configured to link a second reporting configuration to the measurement object,
wherein the first reporting configuration includes the first condition, and the second reporting configuration includes the second condition,
wherein the first condition is associated with one or more offset related quantities, and the second condition is associated with one or more threshold related quantities,
wherein the first condition and the second condition are associated with initiation of the CHO execution for a target cell, and
wherein the configuration information is associated with the CHO execution for the target cell.

7. The method of claim 6, wherein the RRC reconfiguration message is associated with not performing a measurement reporting related operation for the first measurement ID and the second measurement ID.

8. The method of claim 6,
wherein the CHO execution is associated with a start of a timer for the target cell, and
wherein the timer stops after a successful completion of a handover related procedure.

9. A terminal in a wireless communication system, the terminal comprising:
a transceiver; and
at least one processor coupled with the transceiver and configured to:
receive, from a base station, a radio resource control (RRC) reconfiguration message including configuration information associated with a conditional handover (CHO),
identify a first condition and a second condition for triggering a CHO execution for a candidate cell, based on the RRC reconfiguration message, wherein the first condition and the second condition are associated with a first measurement identity (ID) and a second measurement ID, respectively, wherein the first measurement ID is configured to link a first reporting configuration to a measurement object, wherein the second measurement ID is configured to link a second reporting configuration to the measurement object, wherein the first reporting configuration includes the first condition, and the second reporting configuration includes the second condition, and wherein the first condition is associated with one or more offset related quantities, and the second condition is associated with one or more threshold related quantities,
identify whether the first condition is fulfilled, based on the one or more offset related quantities,
identify whether the second condition is fulfilled, based on the one or more threshold related quantities,
in case that the first condition and the second condition are fulfilled for the candidate cell, identify the candidate cell as a target cell, and
initiate the CHO execution for the target cell, based on the configuration information.

10. The terminal of claim 9, wherein the RRC reconfiguration message is associated with not performing a measurement reporting related operation for the first measurement ID and the second measurement ID.

11. The terminal of claim 9, wherein the at least one processor is further configured to:
start a timer for the target cell upon the CHO execution; and
in case that a handover related procedure is successfully completed for the target cell, stopping the timer.

* * * * *